Oct. 21, 1958     E. C. LAFFERTY     2,856,997
TUBE CUTTING APPARATUS
Filed April 28, 1955
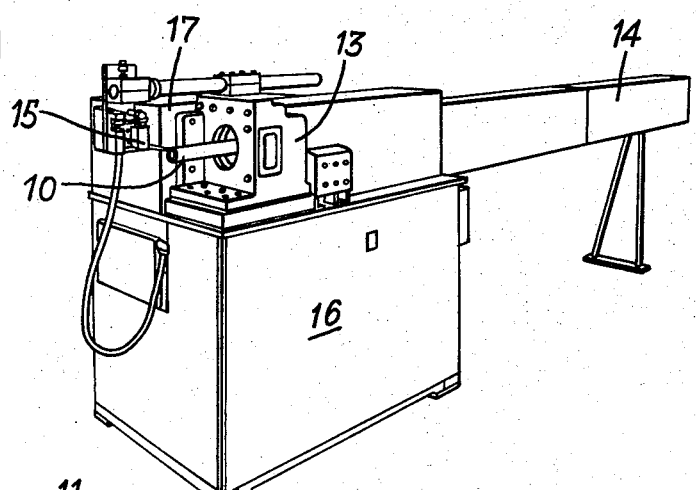
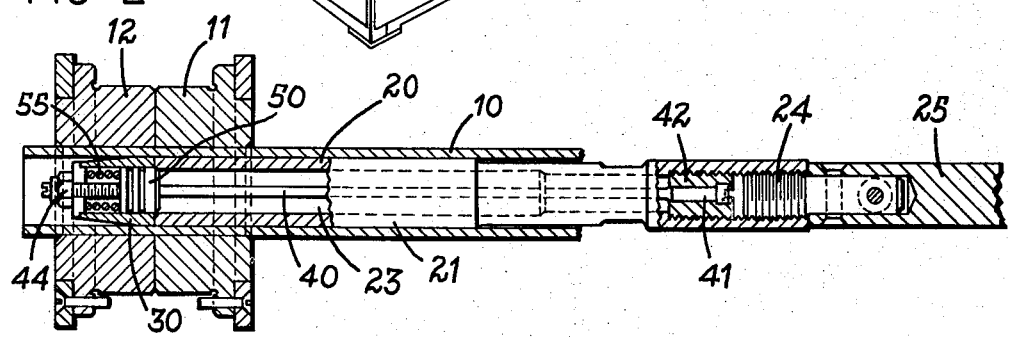
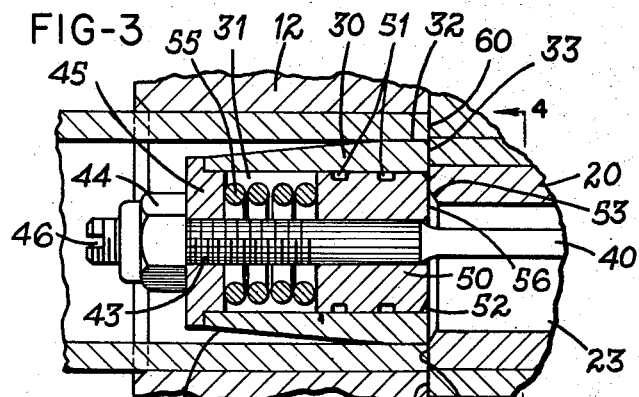
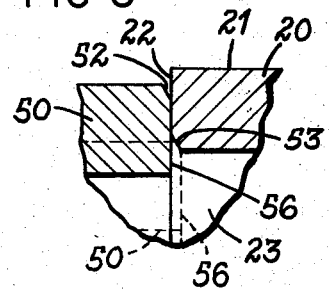
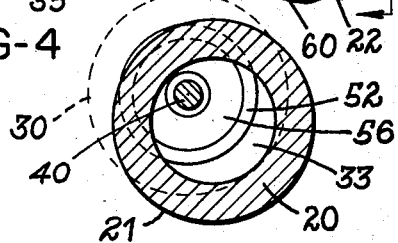
INVENTOR.
EDWARD C. LAFFERTY
BY
Marechal, Biebel, French & Bugg
ATTORNEYS

United States Patent Office 2,856,997
Patented Oct. 21, 1958

2,856,997
TUBE CUTTING APPARATUS

Edward C. Lafferty, Springfield, Ohio, assignor, by mesne assignments, to Kelsey-Hayes Company, a corporation of Delaware Application April 28, 1955, Serial No. 504,517

4 Claims. (Cl. 164—40)

This invention relates to apparatus for cutting tubular stock such as metal pipe and other tubing.

The invention is especially related to tube cutting apparatus wherein two pairs of inner and outer cutters are adapted respectively to be received within the stock and to encircle the stock and are supported for relative movement transversely of the axis of the stock to shear the stock with minimum distortion. Examples of such apparatus are found in C. M. Brehm Patent 2,627,921, issued February 10, 1953, and C. M. Brehm application Serial No. 408,664, filed February 8, 1954, now Patent 2,837,156, issued June 3, 1958, both being assigned to the assignee of the present application.

It is a primary object of the present invention to provide an inner mandrel assembly of improved and simplified construction for use in tube cutting apparatus of the above characteristics in combination with a pair of outer annular cutters adapted to encircle the stock and supported for relative movement transversely of the stock.

A further object of the invention is to provide an inner mandrel assembly as outlined above wherein a punch carried by and movable relative to a hollow mandrel member has its working face clamped firmly against the complementary working face of the mandrel member by one end of an elongated flexible tension member which has its other end anchored to the mandrel member and which is capable of flexing back and forth within the mandrel member during a cutting operation while maintaining the desired pressure engagement between the working faces of the punch and the mandrel member.

It is also an object of the invention to provide an inner mandrel assembly as outlined above which incorporates a simple and effective mechanism for accurately centering the punch and the mandrel member following mum tendency to interfere with or otherwise decrease the desired maintained pressure engagement between the working faces of the punch and the mandrel member.

Additional objects and advantages of the invention will be apparent from the following description, the accompanying drawing and the appended claims.

In the drawing—

Fig. 1 is a perspective view of a complete tube cutting apparatus of the type to which the present invention relates;

Fig. 2 is a sectional view through a pair of outer cutters and an inner mandrel assembly constructed in accordance with the invention for incorporation in the apparatus of Fig. 1, the parts being shown in neutral position prior to a cutting operation;

Fig. 3 is an enlarged fragment of Fig. 2 showing the relative positions of the parts at the end of the first stroke of a cutting operation;

Fig. 4 is a fragmentary section on the line 4—4 of Fig. 3 following completion of the second cutting stroke; and Fig. 5 is a further enlarged fragmentary sectional view illustrating the operation of the centering mechanism in the mandrel assembly.

Referring to the drawing, which illustrates a preferred embodiment of the invention, Fig. 1 shows tube cutting apparatus constructed as disclosed in the above Brehm Patent No. 2,837,156 for cutting the tubular stock 10 into a series of shorter lengths by successive right angled movements of complementary inner and outer cutters operated by a pair of fluid pressure cylinders. The outer cutters are represented at 11 and 12 in Fig. 2 and are carried within the block assembly 13 of Fig. 1. The stock is fed forward after each cutting operation by feeding apparatus within the housing extension 14 and is periodically stopped in predetermined position for cutting by a stop assembly 15 as described in the Brehm application. In the illustrated apparatus, one fluid pressure cylinder is mounted in the base 16 and executes a first working stroke upwardly, and the other cylinder is mounted within the housing portion 17 and executes the second working stroke from left to right as viewed in Fig. 1.

As stated, Fig. 2 shows the outer annular cutters 11 and 12 which encircle the tube 10 and which are in turn connected as described in the above Patent 2,837,156 with the other operating parts of the apparatus, the cutter 11 being stationary and the cutter 12 being movable. The inner mandrel assembly includes an extended hollow mandrel member 20 having a cylindrical portion 21 of substantial length at its forward end which forms the stationary inner cutter and terminates in a flat annular end face 22 accurately perpendicular to the axis of the mandrel member. This mandrel member 20 has a central bore 23 of substantial diameter, and its rearward end is detachably connected by a threaded coupling 24 to an extension rod 25 to facilitate changing of the mandrel assembly in accordance with the size of the tube stock to be cut.

The movable inner cutter of the mandrel assembly is a tubular punch 30 having a central bore 31 of greater diameter than the mandrel bore 23. The outer surface of punch 30 includes a short cylindrical portion 32 of the same outer diameter as the mandrel portion 21 which terminates in a flat end face 33 matching the end face 22 on the mandrel bore. The forward end portion 35 of the punch 30 is tapered to a reduced diameter to facilitate loading of a new length of tube stock into the apparatus from left to right as viewed in Fig. 2 for subsequent cutting.

Special provision is made in accordance with the invention for effecting accurate centering of the punch 30 with respect to the mandrel member 20 following completion of a cutting operation in order to facilitate proper feeding of the stock after each cut. An elongated tension member 40 extends through the bore 23 of the mandrel member 20 and is anchored at its rearward end to the mandrel member. The tension member 40 is shown and referred to hereinafter for convenience as a rod, and this term includes similar members of relatively small diameter such as piano wire which can be used to practice the invention, particularly in cutting stock of small diameter. The rod 40 has an enlarged head 41 anchored in the back end of the bore 23 by a threaded fitting 42 as shown.

The forward end 43 of the tension rod 40 is enlarged and threaded to receive a nut 44 and a cooperating collar 45 which seats in and on the forward end of the punch 30 so that when the nut 44 is tightened, collar 45 will clamp the punch in a relationship of pressure engagement between its end face 33 and the end face 22 of the mandrel member. At the same time, since the rod 40 is thus placed in tension, the punch 30 is capable of movement laterally with respect to the mandrel member as required for working strokes of the apparatus even while remaining in maintained pressure engagement therewith. The forward end of the rod 40 is slotted at 46 to receive a screw driver when the nut 44 is to be tightened or released.

The rod 40 and punch 30 carry simple means for effecting accurate relative centering of the punch and the mandrel member 20 following completion of a cutting operation without affecting the maintained pressure engagement of their cutting faces 33 and 22. A cylindrical plunger 50 is mounted for close sliding movement within punch 30 and is accordingly provided with one or more lubricant grooves 51 in its outer surface. The inner end of plunger 50 has a conically tapered outer surface portion 52 which is tapered at a relatively flat angle to the axis of the plunger, shown as 60°, and the forward end of mandrel member 20 has a complementary seat 53 tapered at substantially the same angle. A compression spring 55 is mounted between the plunger 50 and collar 45 for biasing the plunger into a seated position in recess 53 to effect accurate relative centering of the punch and the mandrel member.

It will be apparent that the dimensions of these several parts will be different depending upon the diameter and wall thickness of the tubular stock 10 to be cut. In order, however, to facilitate understanding of the invention, one set of dimensions will be given as illustrating the practice of the invention as applied to a selected stock, which for the purposes of the example is copper tubing having an outer diameter of 1 inch and a wall thickness of 0.110 inch.

In order to assure proper feeding action with stock which is not perfectly cylindrical, some clearance is desirably provided both inside and outside the tube, and in this example satisfactory results are obtained with an inner diameter of 1.008 inches for the outer cutters 11 and 12 and an outer diameter of .772 inch for the cutter portions 21 and 32 of the mandrel member and punch. The diameter of the bore 23 in the mandrel member is .500 inch, and the major portion of the length of the rod 40 has a diameter of .125 inch, while its threaded end 43 is increased to a diameter of .164 inch. The inner diameter of the punch 30 is .531 inch for close sliding support of a plunger 50 having an outer diameter of .530 inch and an inner diameter of .1875 inch for free sliding over the threaded portion 43 of rod 40. The conical portion 52 of plunger 50 has a radial width of .03125 inch to provide a flat inner end face 56 on the plunger of a radial width of approximately .140 inch. The seat 53 is tapered at 60° to the axis of the mandrel member and is relatively shallow, having a radial width of .03125 inch and an outer diameter of .5625 inch.

Fig. 2 shows the position of the parts prior to commencement of a cutting operation, and the same relative positioning of the parts 20 and 50 is shown in dotted lines in Fig. 5, the conical face 52 on plunger 50 being centered in the seat 53 to maintain the mandrel member 20 and punch 30 in accurately centered relation for the feeding operation of the tube which followed completion of the previous cut. Fig. 3 shows the cutting parts following the first cutting stroke, which in this example is upwardly for a total distance of approximately .105 inch to shear portions along the top and bottom of the tube 10 as indicated at 60 while leaving the side portions still uncut. During this stroke, the rod 40 will flex upwardly within bore 23 as shown in Fig. 3. The second cutting stroke is laterally, from right to left as viewed in Fig. 4, to shear the remaining side portions of the stock, and Fig. 4 shows the positions of the punch 30, rod 40 and plunger 50 following completion of this stroke, with the rod 40 having flexed still further from its position shown in Fig. 3 while maintaining the punch and mandrel member in firm pressure engagement.

Figs. 3–5 also illustrate the operation of the centering mechanism. Since the cutting stroke is greater than the radial width of the cone face 52 on plunger 50, during the first stroke the plunger will ride up and out of the seat 53 until its flat end face 56 seats on the end face 22 of the mandrel member as shown in detail in Fig. 5. The centering action of these parts will therefore be ineffective during the latter part of the first cutting stroke and the entire second cutting stroke as clearly indicated in Fig. 4. Thereafter, when the fluid pressure cylinders are operated in the reverse direction to return the outer cutters to their neutral or centered position, the punch 30 will be carried back by the movable cutter 12 to a close approximation of its centered position, namely within the tolerance provided between the inner and outer cutters for variations of the stock from truly cylindrical shape. Since this tolerance is less than the radial dimensions of the cone face 52 and seat 53, the centering plunger 50 will again become effective as the parts approach their centered positions and will complete the centering operation by again seating in the tapered seat 53.

This mandrel construction offers important practical advantages from a variety of aspects. In particular, the cooperative arrangement of the tension rod 40 with the punch and the stationary mandrel member assures maintained and adjustable pressure engagement of the cutting faces of the punch and mandrel member with maximum protection against possible inclusion of chips or other foreign matter between these faces, and this in turn assures maintained clean and precise cutting action. Since the major part of the centering effect of the inner cutters is accomplished automatically by operation of the apparatus, the centering punch can be of simple form and can be arranged to operate only when the parts are already close to a truly centered relationship, with the further advantage that this centering action resulting from the biasing effect of spring 55 need not be particularly strong since it will merely complete the motion of the inner cutter assembly parts already initiated by the main operating mechanism of the apparatus. In addition, with the plunger 50 and its spring 55 arranged as shown within the punch, the spring acts against the collar 45 rather than the punch itself, and thus the centering spring has no tendency at any time to force the punch and mandrel member axially apart. This is especially desirable and important because if it were not the case, any spring force tending to separate the inner cutting faces would also encourage introduction of dirt or chips between these cutting faces, with resulting rapid deterioration of their cutting action.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An inner mandrel assembly for use in apparatus for cutting tubular stock in combination with a pair of outer annular cutters adapted to encircle the stock and supported for relative movement transversely of the axis of the stock, comprising an elongated hollow mandrel member receivable within the stock and having a central bore of substantial diameter providing an annular forward end face thereon, said end face being flat and substantially perpendicular to the axis of said mandrel member, a tubular punch having a flat end face in engagement with said mandrel face and of substantially the same outer diameter, an elongated rod of substantially lesser diameter than said mandrel member bore extending freely therethrough and into said punch, means anchoring the inner end of said rod to said mandrel member, means forming a threaded adjustable connection between said punch and the outer end of said rod for developing tension in said rod clamping said punch into maintained pressure engagement with said end face of said mandrel member while providing for lateral movement of said punch and the outer end of said rod relative to said mandrel member with accompanying flexing of said rod, and means carried internally by said punch for effecting accurate centering of said punch relative to said mandrel member following completion of a cutting operation.

2. An inner mandrel assembly for use in apparatus for cutting tubular stock in combination with a pair of outer annular cutters adapted to encircle the stock and supported for relative movement transversely of the axis of the stock, comprising an elongated hollow mandrel member receivable within the stock and having a central bore of substantial diameter providing an annular forward end face thereon, said end face being flat and substantially perpendicular to the axis of said mandrel member, a tubular punch having a flat end face in engagement with said mandrel face and of substantially the same outer diameter, an elongated rod of substantially lesser diameter than said mandrel member bore extending freely therethrough and into said punch, means anchoring the inner end of said rod to said mandrel member, a collar engaging said punch in substantially fixed lateral relation therewith and receiving said rod slidably therethrough, means forming a threaded adjustable connection between said collar and the outer end of said rod for developing tension in said rod clamping said punch into maintained pressure engagement with said end face of said mandrel member while providing for lateral movement of said punch with said collar and the outer end of said rod relative to said mandrel member with accompanying flexing of said rod, a centering plunger slidably carried within said punch on said rod and having a frusto-conical inner end face, said mandrel member having a tapered seat at the outer end of said central bore to receive said plunger face, a spring supported within said punch between said collar and said plunger for biasing said plunger into seated position in said tapered seat to effect accurate relative centering of said punch and said mandrel member following completion of a cutting operation, and the taper of said frusto-conical face being relatively flat to provide for disengagement thereof from said seat against the biasing force of said spring in response to lateral movement of said punch with respect to said mandrel member.

3. An inner mandrel assembly for use in apparatus for cutting tubular stock in combination with a pair of outer annular cutters adapted to encircle the stock and supported for relative movement transversely of the axis of the stock, comprising a mandrel member receivable in the stock and having a flat forward end face, a tubular punch having a flat rearward end face in engagement with said mandrel face and of substantially the same outer diameter, means carried by said mandrel member for clamping said punch and said mandrel member axially together to maintain said faces in relatively slidable pressure engagement, a centering plunger slidably mounted within said punch and having a relatively flat frusto-conical portion at the inner end thereof adjacent said mandrel member, said mandrel member having a complementary tapered recess in said end face thereof for receiving said conical portion of said plunger, a spring carried within said punch and seated between said plunger and said clamping means for biasing said plunger toward said mandrel member to effect centering of said punch relative to said mandrel member following completion of a work operation with minimum tendency to separation of said end faces of said punch and said mandrel member, and the taper of said frusto-conical portion of said plunger being relatively flat to provide for disengagement thereof from said recess against the biasing force of said spring in response to lateral movement of said punch with respect to said mandrel member.

4. An inner mandrel assembly for use in apparatus for cutting tubular stock in combination with a pair of outer annular cutters adapted to encircle the stock and supported for relative movement transversely of the axis of the stock, comprising a mandrel member receivable in the stock and having a flat forward end face, a tubular punch having a flat rearward end face in engagement with said mandrel face and of substantially the same outer diameter, means clamping said punch and said mandrel member axially together to maintain said faces in relatively slidable pressure engagement, a centering plunger slidably mounted within said punch and having a relatively flat frusto-conical portion at the inner end thereof adjacent said mandrel member, said mandrel member having a complementary tapered recess in said end face thereof for receiving said conical portion of said plunger, a spring within said punch biasing said plunger toward said mandrel member, and the taper of said frusto-conical portion of said plunger being relatively flat to provide for disengagement thereof from said recess against the biasing force of said spring in response to lateral movement of said punch with respect to said mandrel member.

References Cited in the file of this patent

UNITED STATES PATENTS

| | | |
|---|---|---|
| 1,280,199 | Erickson | Oct. 1, 1918 |
| 1,965,228 | Gabriel | July 3, 1934 |
| 2,038,255 | Worthington | Apr. 21, 1936 |
| 2,397,048 | Roop | Mar. 19, 1946 |
| 2,435,469 | Roop | Feb. 3, 1948 |

UNITED STATES PATENT OFFICE
CERTIFICATE OF CORRECTION

Patent No. 2,856,997                                                               October 21, 1958

Edward C. Lafferty

It is hereby certified that error appears in the printed specification of the above numbered patent requiring correction and that the said Letters Patent should read as corrected below.

Column 1, line 34, for "the stock" read -- the axis of the stock --; lines 50 and 51, for "following mum" read -- following completion of a fitting operation while having minimum --.

Signed and sealed this 10th day of February 1959.

(SEAL)
Attest:

KARL H. AXLINE
Attesting Officer

ROBERT C. WATSON
                                       Commissioner of Patents